US012673415B2

(12) United States Patent
Takeda

(10) Patent No.: US 12,673,415 B2
(45) Date of Patent: **\*Jul. 7, 2026**

(54) CONVEYANCE DEVICE

(71) Applicant: AIDA ENGINEERING, LTD.,
Kanagawa (JP)

(72) Inventor: Keisuke Takeda, Sagamihara (JP)

(73) Assignee: AIDA ENGINEERING, LTD.,
Kanagawa (JP)

( * ) Notice: Subject to any disclaimer, the term of this
patent is extended or adjusted under 35
U.S.C. 154(b) by 0 days.

This patent is subject to a terminal dis-
claimer.

(21) Appl. No.: 19/402,367

(22) Filed: Nov. 26, 2025

(65) Prior Publication Data

US 2026/0158644 A1 Jun. 11, 2026

(30) Foreign Application Priority Data

Dec. 6, 2024 (JP) ................................. 2024-213201

(51) Int. Cl.
*B25J 9/10* (2006.01)
*B25J 9/00* (2006.01)

(52) U.S. Cl.
CPC ........... *B25J 9/1035* (2013.01); *B25J 9/0009*
(2013.01); *B25J 9/102* (2013.01)

(58) Field of Classification Search
CPC ......... B25J 9/102; B25J 9/1035; B25J 9/0009
See application file for complete search history.

(56) References Cited

U.S. PATENT DOCUMENTS

| | | | |
|---|---|---|---|
| 12,115,656 B1 * | 10/2024 | Tolson | .................. F16H 57/082 |
| 2007/0232433 A1 | 10/2007 | Haga et al. | |
| 2009/0019961 A1 | 1/2009 | Kobayashi | |

(Continued)

FOREIGN PATENT DOCUMENTS

| | | |
|---|---|---|
| CN | 107520836 A | 12/2017 |
| CN | 110662633 A | 1/2020 |

(Continued)

OTHER PUBLICATIONS

Extended European Search Report dated Nov. 4, 2024, issued in
corresponding European Patent Application No. 24182761.7, 7
pages.

(Continued)

*Primary Examiner* — Minnah L Seoh
*Assistant Examiner* — Gregory T Prather
(74) *Attorney, Agent, or Firm* — RIMON P.C.

(57) ABSTRACT

A conveyance device includes a fixed base, a turning body,
two or more servomotors, a conveyance arm, and two or
more speed reducers. The turning body includes a large gear
serving as an external gear. Each of the speed reducers
includes a housing integrated with the fixed base, a planetary
carrier rotatably supported inside the housing, an internal
gear provided inside the housing, a sun gear connected to an
output shaft of one of the servomotors, a plurality of
planetary gears arranged around the sun gear and rotatably
supported by the planetary carrier, and an output gear that
rotates integrally with the planetary carrier. The planetary
gear meshes with the sun gear and meshes with the internal
gear. The output gear has a smaller diameter than a diameter
of the large gear and meshes with the large gear outside the
large gear.

4 Claims, 4 Drawing Sheets

(56) References Cited

U.S. PATENT DOCUMENTS

| | | | |
|---|---|---|---|
| 2009/0233750 A1 | 9/2009 | Nakamura | |
| 2018/0071912 A1 | 3/2018 | Rouaud et al. | |
| 2021/0154830 A1* | 5/2021 | Lee | F16H 1/28 |
| 2022/0099162 A1 | 3/2022 | Hirose | |
| 2022/0349463 A1 | 11/2022 | Kito et al. | |
| 2024/0416505 A1 | 12/2024 | Takeda | |

FOREIGN PATENT DOCUMENTS

| | | |
|---|---|---|
| CN | 111923062 A | 11/2020 |
| CN | 115446805 A | 12/2022 |
| DE | 102015006311 B4 | 2/2023 |
| JP | 2007-085530 A | 4/2007 |
| JP | 2010-023195 A | 2/2010 |
| JP | 2011-212839 A | 10/2011 |
| JP | 2012-011418 A | 1/2012 |
| JP | 2018-202545 A | 12/2018 |
| JP | 2020-148324 A | 9/2020 |
| JP | 2022-054866 A | 4/2022 |
| JP | 2022-170482 A | 11/2022 |

OTHER PUBLICATIONS

Non-Final Office Action issued in corresponding U.S. Appl. No. 18/741,374, dated Mar. 18, 2025.
Final Office Action issued in corresponding U.S. Appl. No. 18/741,374, dated Jul. 3, 2025.
Non-Final Office Action issued in corresponding U.S. Appl. No. 18/741,374, dated Oct. 17, 2025.
Office Action dated Mar. 31, 2026, issued in corresponding Japan Patent Application No. 2023-099997.
Extended European Search Report dated Apr. 20, 2026, issued in corresponding European Patent Application No. 25221217.0.

* cited by examiner

CONVEYANCE DEVICE

CROSS-REFERENCE TO RELATED APPLICATION

Japanese Patent Application No. 2024-213201, filed on Dec. 6, 2024, is hereby incorporated by reference in its entirety.

BACKGROUND OF THE INVENTION

Field of the Invention

The present invention relates to a conveyance device that conveys a workpiece using a conveyance arm.

Description of Related Art

Conventionally, in a conveyance device that turns a conveyance arm, an eccentric swing type speed reducer is often adopted as a drive mechanism for turning the conveyance arm (for example, JP 2011-212839 A). Such an eccentric swing type speed reducer has a small backlash and, as such, there is an advantage in that position accuracy in conveyance operation is excellent when the eccentric swing type speed reducer is adopted in the conveyance device.

Further, a speed reducer using a planetary gear for a drive mechanism such as a joint of a robot is also known (for example, JP 2018-202545 A).

However, when it is assumed that an industrial robot including the eccentric swing type speed reducer as disclosed in JP 2011-212839 A is used as, for example, a conveyance device for carrying a workpiece from a stacker on which a press working workpiece is loaded into a press machine, a conveyance device for carrying a workpiece worked by a press machine from the press machine to a stocker, or a conveyance device for conveying a workpiece from one press machine to the other press machine among the plurality of press machines, it is necessary to perform a reciprocating operation (a swing operation) of the conveyance arm at a higher speed in a limited region (space) in order to improve production efficiency. Therefore, when the turning speed of the conveyance arm is increased, heat is generated at the inner side of the speed reducer and a component expands, which causes a problem that an increase in speed is limited.

Furthermore, in the speed reducer disclosed in JP 2018-202545 A, heat generation is suppressed even when the reciprocating operation of the conveyance arm is speeded up. However, in order to increase output torque of a motor so as to implement a high-speed turning operation by an inexpensive and lightweight motor, it is necessary to increase a speed reduction ratio by connecting gears to each other in a plurality of stages. The multi-stage connection of the gears in this case is accompanied by an increase in a distance from a turning shaft of the conveyance arm to a position of the center of gravity of the motor. That is, the moment of inertia of a turning portion itself of the conveyance device increases. This increase in moment of inertia limits an increase in acceleration or deceleration of the conveyance arm that continuously performs the reciprocating operation within a limited region, which leads to hindering implementation of continuous high-speed conveyance.

SUMMARY OF THE INVENTION

The present disclosure can provide a conveyance device capable of easily securing a large speed reduction ratio of a speed reducer and realizing an increase in speed of a conveyance arm that repeatedly performs a swinging operation.

A conveyance device according to an aspect of the disclosure includes:

a fixed base;

a turning body supported by the fixed base via a bearing;

two or more servomotors fixed to the fixed base and configured to rotate the turning body relative to the fixed base;

a conveyance arm configured to be able to convey a workpiece by turning in conjunction with the turning body; and two or more speed reducers fixed to the fixed base and respectively connected to the two or more servomotors, in which the turning body includes a large gear serving as an external gear, each of the speed reducers includes:

a housing integrated with the fixed base;

a planetary carrier rotatably supported inside the housing;

an internal gear provided inside the housing;

a sun gear connected to an output shaft of one of the servomotors;

a plurality of planetary gears arranged around the sun gear and rotatably supported by the planetary carrier; and an output gear configured to rotates integrally with the planetary carrier, the planetary gear meshes with the sun gear and meshes with the internal gear, and the output gear has a smaller diameter than a diameter of the large gear and meshes with the large gear outside the large gear.

DESCRIPTION OF THE INVENTION

Figure 1:
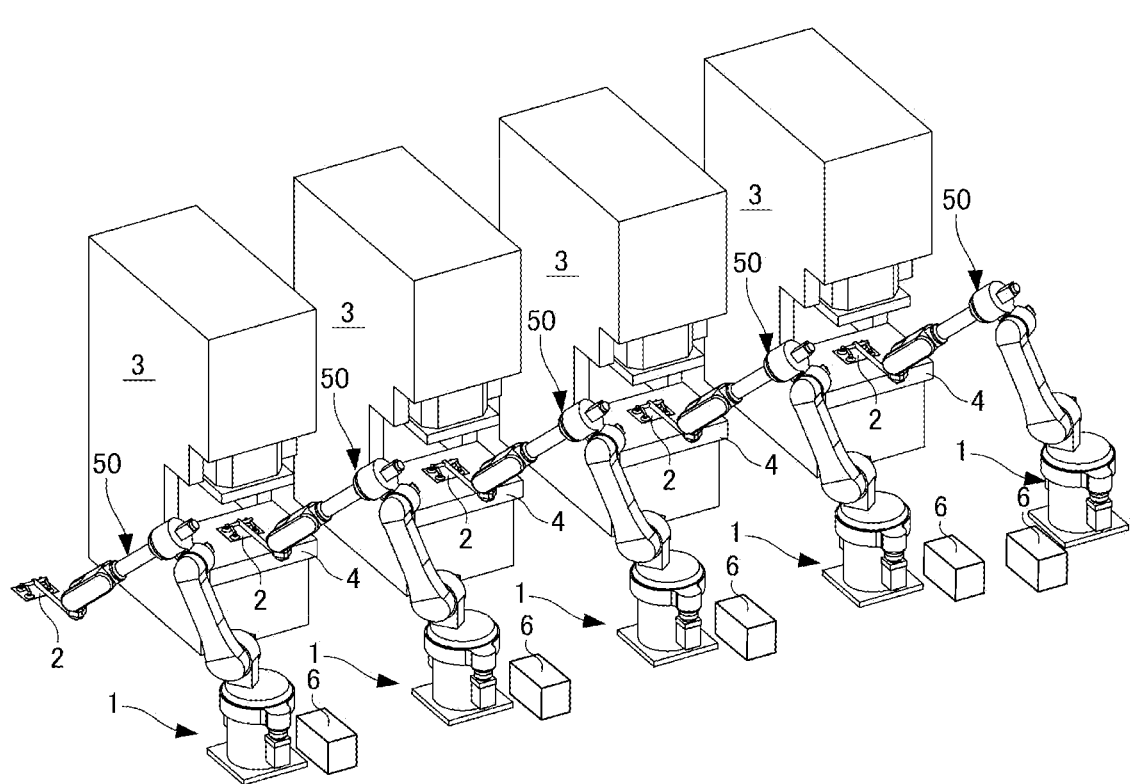
FIG. 1 is a perspective view of a plurality of conveyance devices and a plurality of press machines according to a present embodiment.

[1] A conveyance device according to an embodiment of the present invention includes:

a fixed base;

a turning body supported by the fixed base via a bearing;

two or more servomotors fixed to the fixed base and configured to rotate the turning body relative to the fixed base;

a conveyance arm configured to be able to convey a workpiece by turning in conjunction with the turning body; and two or more speed reducers fixed to the fixed base and respectively connected to the two or more servomotors, in which the turning body includes a large gear serving as an external gear, each of the speed reducers includes:

a housing integrated with the fixed base;

a planetary carrier rotatably supported inside the housing;

an internal gear provided inside the housing;

a sun gear connected to an output shaft of one of the servomotors;

a plurality of planetary gears arranged around the sun gear and rotatably supported by the planetary carrier; and an output gear configured to rotate integrally with the planetary carrier, the planetary gear meshes with the sun gear and meshes with the internal gear, and the output gear has a smaller diameter than a diameter of the large gear and meshes with the large gear outside the large gear.

According to the above embodiment of the conveyance device, by using the planetary gear without using an eccentric swing type speed reducer that easily generates heat as in JP 2011-212839 A, it is possible to increase the turning speeds of the turning body and the conveyance arm while suppressing heat generation. Further, according to the above embodiment of the conveyance device, by disposing the two or more speed reducers using the planetary gears around the large gear serving as the external gear, a high speed reduction ratio may be easily secured.

[2] In the above embodiment of the conveyance device, the two or more servomotors may include a first servomotor and a second servomotor, the output gear may include a first output gear rotated by the first servomotor and a second output gear rotated by the second servomotor, the large gear may rotate around a first rotation axis, and the first output gear may be located at a position allowing the first output gear to face the second output gear with the first rotation axis interposed between the first output gear and the second output gear.

According to the above embodiment of the conveyance device, since the first and second output gears are located at the positions allowing the first and second output gears to face each other with the large gear interposed therebetween, stress balance of the large gear at a position where the large gear meshes with the first and second output gears is reliable, and the life span of the gear may be prolonged.

[3] In the above embodiment of the conveyance device, the workpiece may be a metal plate for press working or a product after press working.

According to the above embodiment of the conveyance device, even when a metal workpiece is conveyed, the conveyance speed of the workpiece may be increased.

Hereinafter, preferred embodiments of the present invention are described in detail with reference to the drawings. It is noted that the embodiments described below do not unduly limit the contents of the present invention described in the claims. In addition, not all the configurations described below are essential configurations of the present invention.

1. Overview of Conveyance Device

Figure 2:
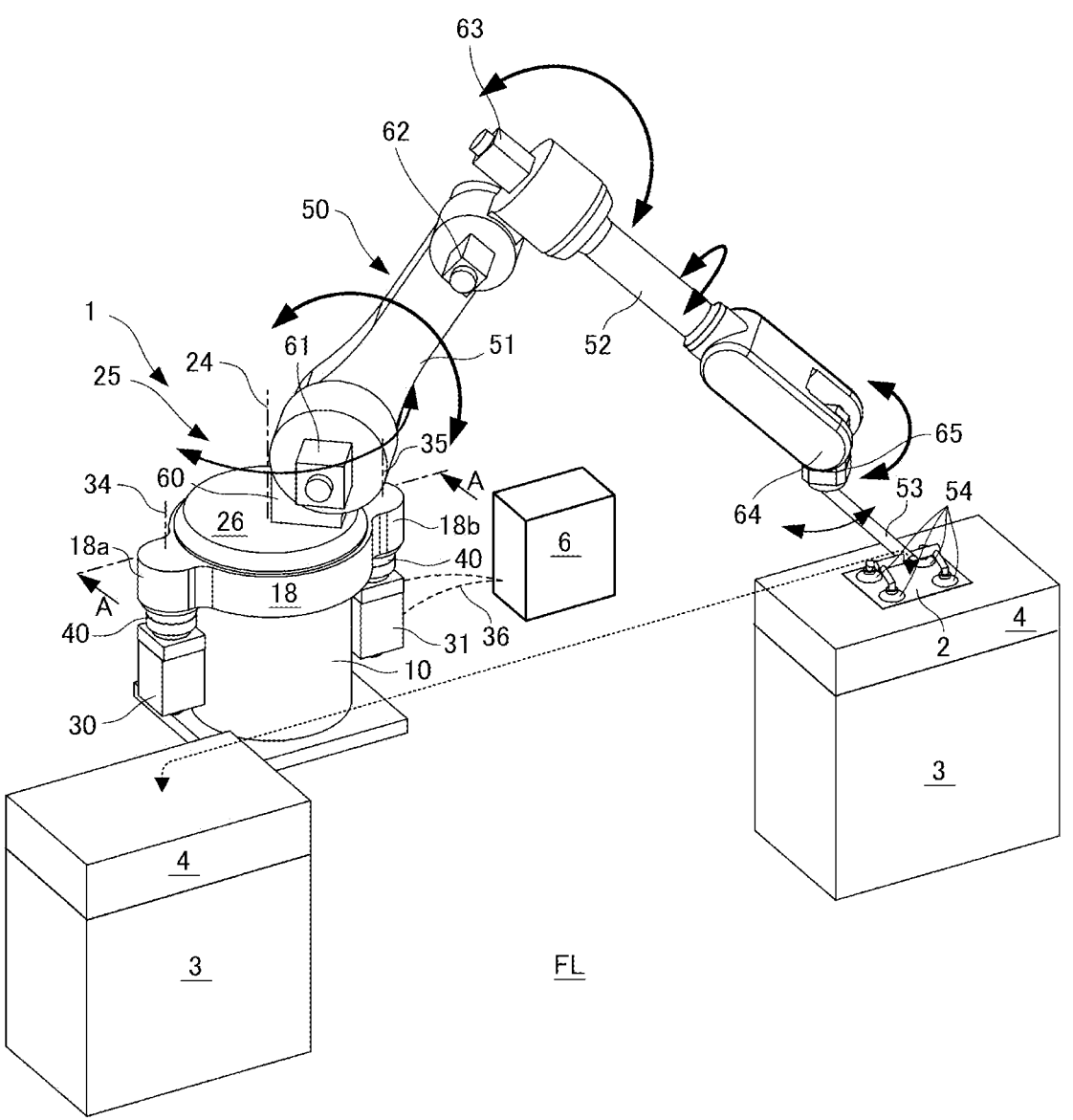
FIG. 2 is a perspective view of the conveyance device according to the present embodiment.

FIG. 1 is a perspective view of a plurality of conveyance devices 1 and a plurality of press machines 3 according to the present embodiment, and FIG. 2 is a perspective view of the conveyance device 1 according to the present embodiment. In FIG. 2, the upper portion of the press machine 3 is omitted and schematically illustrated. Further, FIG. 2 is a perspective view of the conveyance device 1 when viewed from the opposite side of FIG. 1.

As illustrated in FIGS. 1 and 2, the conveyance device 1 is disposed, for example, adjacent to the press machine 3. In addition, for example, as illustrated in FIG. 1, a plurality of conveyance devices 1 may be arranged in a production line in which a plurality of press machines 3 are arranged and processed workpieces 2 are sequentially conveyed to the adjacent press machines 3. Each of the press machines 3 includes a mold 4. For example, the conveyance device 1 may be configured to carry an unprocessed workpiece 2 into the press machine 3 at the left end in FIG. 1, the conveyance device 1 may sequentially convey the processed workpiece 2 to the press machine 3 at the right end, and the conveyance device 1 at the right end may carry out the processed workpiece 2 from the press machine 3 at the right end. As described above, the plurality of conveyance devices 1 are arranged in a line in which a plurality of single-shot press machines 3 are arranged, thereby improving production efficiency and improving a degree of freedom of a production line.

The conveyance device 1 includes a fixed base 10, a turning body 26 supported by the fixed base 10 via a bearing 16 (FIG. 3), two or more servomotors (30, 31) fixed to the fixed base 10 and configured to rotate the turning body 26 relative to the fixed base 10, a conveyance arm 50 configured to be able to convey the workpiece 2 by turning in conjunction with the turning body 26, and two or more speed reducers 40 fixed to the fixed base 10 and respectively connected to the two or more servomotors.

In the present embodiment, two or more servomotors will be described as a first servomotor 30 and a second servomotor 31. The number of servomotors may be three or more. The first servomotor 30 and the second servomotor 31 are fixed to the fixed base 10, and can rotate the turning body 26 relative to the fixed base 10. The two or more speed reducers 40 are fixed to the fixed base 10. The number of speed reducers 40 may be three or more in accordance with the number of servomotors. The conveyance device 1 may include a control device 6 that controls the operation of the conveyance device 1 including a servomotor.

The fixed base 10 is installed, for example, on a floor FL of a factory. The fixed base 10 has a mounting portion 18 protruding laterally from an upper portion of the fixed base 10. The mounting portion 18 has protruding portions 18a and 18b formed to significantly protrude from the fixed base 10 and disposed at positions allowing the protruding portions 18a and 18b to face each other with a first rotation axis 24 interposed therebetween. In the mounting portion 18, the speed reducers 40 are respectively fixed to the protruding portions 18a and 18b. The first servomotor 30 and the second servomotor 31 are fixed to the mounting portion 18 with a housing 41 (FIG. 3) of the speed reducer 40 interposed therebetween. The first servomotor 30 and the second servomotor 31 can rotate the turning body 26 around the first rotation axis 24 relative to the fixed base 10. The first rotation axis 24 is, for example, an imaginary line located at the center of the turning body 26 and formed to extend in the vertical direction. A second rotation axis 34 and a third rotation axis 35 are set in parallel with the first rotation axis 24 interposed therebetween.

The conveyance arm 50 is configured to be able to convey the workpiece 2 by turning in conjunction with the turning body 26. The conveyance arm 50 is fixed to the turning body 26. The conveyance device 1 can be a so-called articulated robot, and is, for example, a six-axis robot. The conveyance arm 50 includes a plurality of long members, and includes, for example, a first arm 51, a second arm 52, and a long member 53. The conveyance arm 50 can include, for example, a first drive mechanism 61, a second drive mechanism 62, a third drive mechanism 63, a fourth drive mechanism 64, and a fifth drive mechanism 65. Each of the first to fifth drive mechanisms 61 to 65 can include a servomotor. One end of the first arm 51 is rotatably connected to the turning body 26 with a fixing portion 60 interposed therebetween. The fixing portion 60 is integrated with the turning body 26. The first drive mechanism 61 moves the free end of the first arm 51 upwards and downwards by turning the first arm 51 upwards and downwards. The second arm 52 is rotatably connected to the free end of the first arm 51. The second drive mechanism 62 moves the free end on the long member 53 side upwards and downwards by turning the second arm 52 upwards and downwards relative to the free end of the first arm 51. In addition, the third drive mechanism 63 rotates the second arm 52 around the central axis of the second arm 52. The long member 53 is connected to the free end of the second arm 52. The fourth drive mechanism 64 moves suction members 54 upwards and downwards by turning the long member 53 upwards and downwards. The fifth drive mechanism 65 turns the long member 53 in the horizontal direction. A plurality of, for example, four suction members 54 are connected to the free end of the long member 53. The plurality of suction members 54 suctions the surface of the workpiece 2 to hold the workpiece 2. It is noted that the conveyance arm 50 can appropriately adopt a known conveyance arm structure of an articulated robot. Further, the suction member 54 is not limited to the suction mechanism as long as it can hold the workpiece 2, and may be, for example, a gripping mechanism.

The workpiece 2 can be a metal plate for press working or a product after press working. The conveyance device 1 conveys the workpiece 2 on the press machine 3 by driving the first servomotor 30 and the second servomotor 31 to horizontally turn the turning body 26 and the conveyance arm 50 around the first rotation axis 24. In this conveyance operation, for example, the first arm 51, the second arm 52, and the long member 53 are turned by the first drive mechanism 61 to the fifth drive mechanism 65 to move the workpiece 2 vertically and horizontally, and the workpiece 2 is conveyed to an appropriate position of the mold 4 of the adjacent press machine 3. A pressed product tends to be heavy, and press working requires improvement in productivity. With the conveyance device 1, even when the metallic workpiece 2 used for press working is conveyed, the conveyance speed of the workpiece 2 can be increased. In the present embodiment, an example in which the workpiece 2 is conveyed to the press machine 3 will be described, but the workpiece 2 may be disposed adjacent to a device other than the press machine 3. For example, in the case of a machine tool, the workpiece 2 can be a workpiece or a material after cutting, and in the case of an injection molding machine, the workpiece 2 can be a plastic product or an insert material.

The control device 6 is electrically connected to each operation unit of the conveyance device 1. The control device 6 may receive a signal from a sensor (not illustrated) of the conveyance device 1. Further, the control device 6 may be a part of the control device of the press machine 3. The control device 6 includes, for example, an operation unit, a calculation unit, a storage unit, a display unit, and an output unit. The control device 6 includes, for example, a processor such as a central processing unit (CPU) or a graphics processing unit (GPU), a storage medium such as a read only memory (ROM), a random access memory (RAM), or a hard disk drive (HDD), a communication interface that performs high-speed data communication, and a user interface such as a display, a touch panel, or a keyboard. A part or all of the control device 6 may be provided on a cloud via the Internet.

The conveyance operation in the conveyance device 1 can be set in advance using the operation unit. The display unit can display a setting content and an execution status of the conveyance operation. The calculation unit executes each processing for executing the set conveyance operation. Then, the conveyance device 1 can operate according to the conveyance operation stored in the storage unit in response to a command signal from the output unit of the control device 6.

2. Description of Speed-Reduction Mechanism

Figure 3:
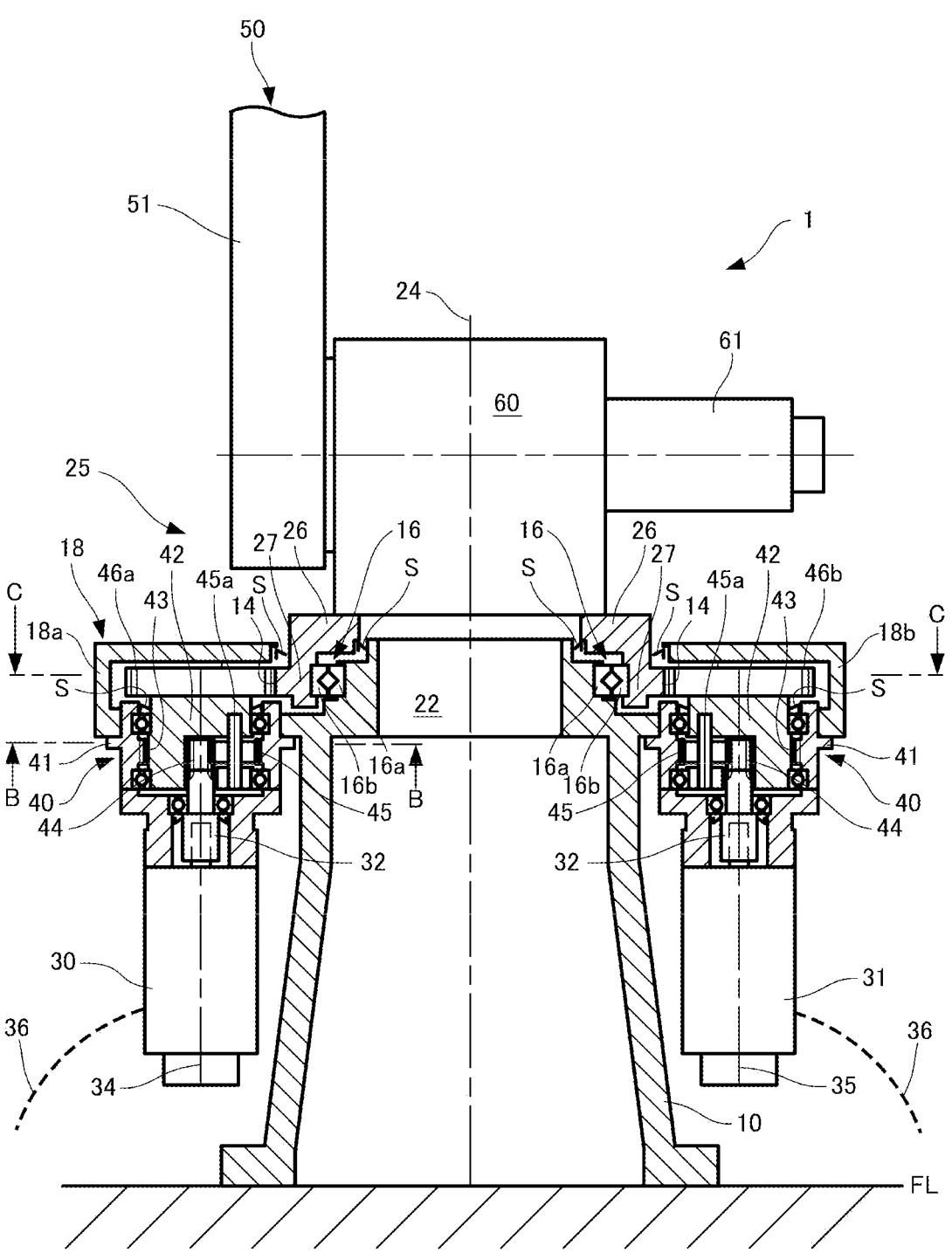
FIG. 3 is a cross-sectional view taken along line A-A in FIG. 2.
Figure 4:
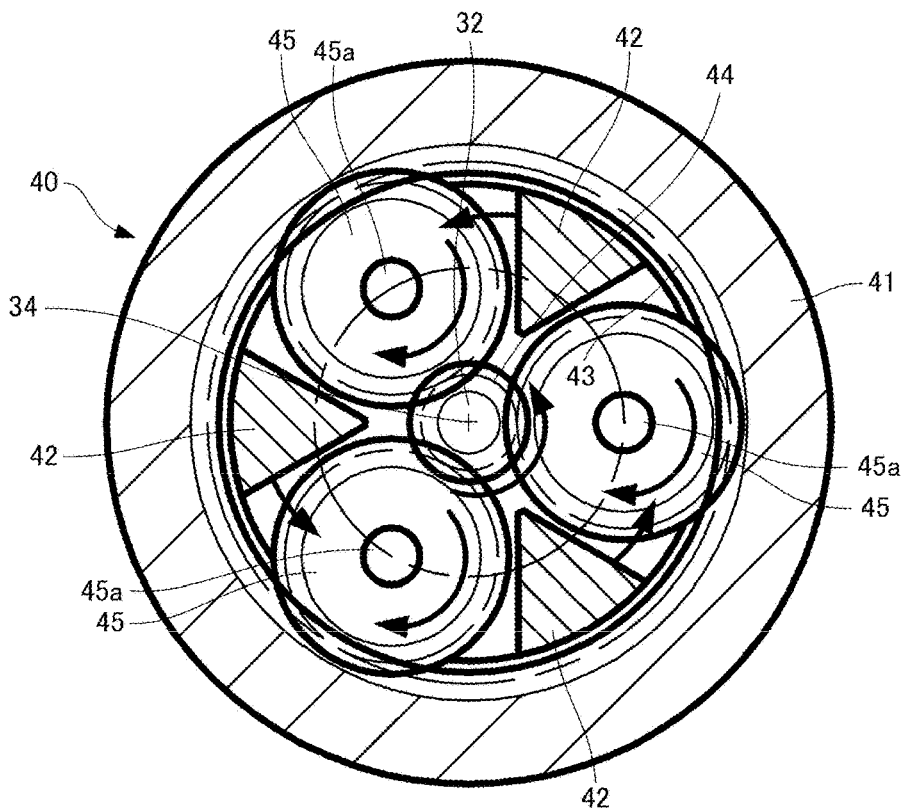
FIG. 4 is a cross-sectional view taken along line B-B in FIG. 3.
Figure 5:
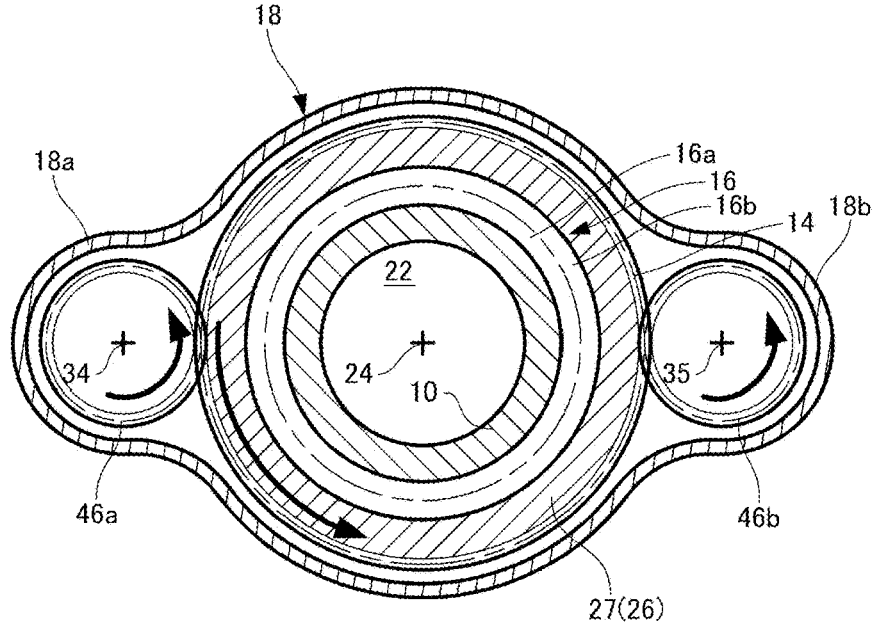
FIG. 5 is a cross-sectional view taken along line C-C in FIG. 3.

A speed-reduction mechanism of the conveyance device 1 will be described in detail with reference to FIGS. 3 to 5. FIG. 3 is a cross-sectional view taken along line A-A in FIG. 2, FIG. 4 is a cross-sectional view taken along line B-B in FIG. 3, and FIG. 5 is a cross-sectional view taken along line C-C in FIG. 3.

The fixed base 10 is disposed on the floor FL and supports the turning body 26 and the conveyance arm 50 in a turnable manner. The fixed base 10 has, for example, a substantially cylindrical shape vertically penetrating along the first rotation axis 24. An inner ring 16a of the bearing 16 is fixed to the upper end outer peripheral edge of the fixed base 10. An outer ring 16b of the bearing 16 is fixed to the inner peripheral surface of an annular end portion 27 of the turning body 26. The bearing 16 is a rolling bearing including a ball or a roller disposed between the outer ring 16b and the inner ring 16a. The bearing 16 is disposed, for example, in one horizontal plane. The bearing 16 is, for example, a cross roller bearing. The fixed base 10 includes, for example, the substantially annular mounting portion 18 protruding laterally from an upper outer peripheral edge of the fixed base 10 lower than the bearing 16.

The mounting portion 18 is provided to be integrated with the fixed base 10. The mounting portion 18 extends from the bottom to the top of a large gear 14 so as to cover the outer sides of the large gear 14 and first and second output gears 46a and 46b. The mounting portion 18 is formed to have a circular shape along the outer peripheral edge of the fixed base 10 when viewed from above, and has the protruding portions 18a and 18b formed to significantly protrude laterally and configured for the first servomotor 30 and the second servomotor 31 to be respectively mounted thereon. The lower inner peripheral edge of the mounting portion 18 extends outwards from the outer peripheral surface of the fixed base 10 below the bearing 16. A slight gap is formed between the upper inner peripheral end surface of the mounting portion 18 and the annular end portion 27 of the turning body 26. A seal member S is fixed to the gap to prevent foreign substances from falling into the internal space in the mounting portion 18. In the mounting portion 18, the first servomotor 30 and the second servomotor 31 are fixed to the respective lower surfaces of the two protruding portions 18a and 18b formed to significantly protrude laterally with the respective housings 41 of the speed reducers 40 interposed therebetween.

The housing 41 is integrated with the fixed base 10. For example, the two housings 41 are fixed at positions allowing the housings 41 to face each other with the fixed base 10 interposed therebetween. The housings 41 are fixed to the mounting portion 18 so as to hang down from the respective lower surfaces of the protruding portions 18a and 18b of the mounting portion 18. Each of the housing 41 has a substantially cylindrical shape that opens vertically. The upper end of the housing 41, for example, extends to the inside of the mounting portion 18 and is fixed therein. The first servo-motor 30 and the second servomotor 31 are fixed to the respective lower ends of the two housings 41. The first servomotor 30 and the second servomotor 31 are fixed to the fixed base 10 with the housing 41 and the mounting portion 18 interposed therebetween, and are constantly located at the fixed positions of the fixed base 10. While the turning body 26 is turning around the first rotation axis relative to the fixed base 10, the first servomotor 30 and the second servomotor 31 maintain the stationary states thereof at the fixed positions. Therefore, the first servomotor 30 and the second servomotor 31 do not contribute to an increase in moment of inertia of a turning unit 25 in the turning operation. The turning unit 25 is a portion that turns relative to the fixed base 10, and includes the turning body 26, the fixing portion 60, and the conveyance arm 50. Since the first servomotor 30 and the second servomotor 31 do not con-tribute to an increase in moment of inertia of the turning unit 25, the first servomotor 30 and the second servomotor 31 can significantly increase a rotational angular acceleration of the turning unit 25. That is, according to the speed-reduction mechanism, the acceleration and deceleration of the turning arm 50 can be increased and as such, the conveyance operation of the conveyance device 1 can be further speeded up. Furthermore, since the first servomotor 30 and the second servomotor 31 are located at the fixed positions thereof, wiring lines 36 of the first servomotor 30 and the second servomotor 31 are hardly affected by the turning operation even while the turning unit 25 performs the turning operation thereof. Therefore, it is possible to avoid a risk that the wiring line 36 is disconnected when the conveyance device 1 is in operation.

The turning body 26 includes the large gear 14 serving as an external gear. The turning body 26 includes a flat disk-shaped portion covering the upper end of the fixed base 10 from above, and the cylindrical annular end portion 27 hanging down from the outer peripheral edge of the disk-shaped portion. The annular end portion 27 is provided so as to cover the outer side of the upper end outer peripheral edge of the fixed base 10. The fixing portion 60 is provided on the upper surface of the turning body 26, and the proximal end of the conveyance arm 50 is rotatably fixed to the fixing portion 60. When the turning body 26 rotates around the first rotation axis 24 relative to the fixed base 10 by driving of the first servomotor 30 and the second servomotor 31, the conveyance arm 50 can be turned around the first rotation axis 24. The large gear 14 is provided over the entire circumference of the outer peripheral surface of the annular end portion 27. The annular end portion 27 has the same height as that of the large gear 14, and the outer ring 16b is fixed to the inner peripheral surface of the annular end portion 27.

An opening 22 may be formed along the first rotation axis 24 in the fixed base 10 and the turning body 26. The conveyance device 1 may be configured such that a wiring line (not illustrated) extends from the fixed base 10 to the servomotors of the first to fifth drive mechanisms 61 to 65 so as to pass through the opening 22 vertically. In the conveyance device 1, since the opening 22 can be provided inside the large gear 14, wiring can be performed using the opening 22. The wiring line may include a signal line to a sensor (not illustrated) or the like. In addition, the wiring line may extend to a lower portion of the fixed base 10 so as to be connected to the control device 6.

The speed reducer 40 includes the housing 41, a planetary carrier 42, an internal gear 43, a sun gear 44, a plurality of planetary gears 45, and the first output gear 46a or the second output gear 46b. The speed reducer 40 and the first servomotor 30 on the left side of FIG. 3 rotate around an output shaft 32 of the first servomotor 30, the planetary carrier 42, and a second rotation axis 34 of the first output gear 46a. The speed reducer 40 and the second servomotor 31 on the right side of FIG. 3 rotate around an output shaft 32 of the second servomotor 31, the planetary carrier 42, and a third rotation axis 35 of the second output gear 46b. The first rotation axis 24, the second rotation axis 34, and the third rotation axis 35 can be arranged parallel to each other. The second rotation axis 34 and the third rotation axis 35 are located at positions allowing the second rotation axis 34 and the third rotation axis 35 to face each other with the first rotation axis 24 interposed therebetween in plan view (for example, FIG. 5). A distance from the second rotation axis 34 to the first rotation axis 24 is the same as a distance from the third rotation axis 35 to the first rotation axis 24.

The following description is a description of the speed reducer 40 illustrated on the left side in FIGS. 3 and 5 of the two speed reducers 40 having basically the same configu-ration. The planetary carrier 42 is rotatably supported inside the housing 41. The planetary carrier 42 has a substantially cylindrical shape and is attached to the housing 41 via bearings disposed at two upper and lower positions on the outer periphery of the planetary carrier 42. The first output gear 46a is integrally fixed to the upper end of the planetary carrier 42. The rotation axis of an output shaft 32 is a second rotation axis 34. Therefore, when the planetary carrier 42 rotates around the second rotation axis 34, the first output gear 46a rotates around the second rotation axis 34. The annular seal member S is provided between the upper end inner peripheral surface (located above the bearing) of the housing 41 and the outer peripheral surface of the planetary carrier 42. The seal member S is an oil seal, and the seal member S can seal lubricating oil in the narrow housing 41 so as to minimize an amount of oil used in the planetary speed-reduction mechanism.

The internal gear 43 is provided inside the housing 41. The internal gear 43 is formed to be integrated with the inner peripheral surface of the cylindrical housing 41 so as to surround the outer periphery of the planetary carrier 42. The internal gear 43 is formed in a plane orthogonal to the second rotation axis 34, here, one horizontal plane.

The sun gear 44 is connected to the output shaft 32 of the first servomotor 30. The sun gear 44 is provided on the outer periphery of the upper end of a rod connected to the output shaft 32. The rod extends from the output shaft 32 to the inside of the planetary carrier 42 along the second rotation axis 34. The sun gear 44 is an external gear and transmits rotation of the output shaft 32 to the speed reducer 40.

The plurality of planetary gears 45 are disposed around the sun gear 44 and are rotatably supported by the planetary carrier 42. In the present embodiment, the number of the planetary gears 45 is three, as illustrated in FIG. 4, but is not limited thereto, and may be four or more. A rotation shaft 45a of the planetary gear 45 is rotatably supported by the planetary carrier 42 on the upper and lower sides. Further, the rotation shaft 45a may be vertically fixed to the planetary carrier 42, and the planetary gear 45 may be rotatable relative to the rotation shaft 45a. The rotation shaft 45a is parallel to the second rotation axis 34. The rotation shaft 45a is disposed around the second rotation axis 34 and is disposed such that a part of the planetary gear 45 protrudes outwards from the outer peripheral surface of the planetary carrier 42. Each planetary gear 45 meshes with the sun gear 44 on the center side of the planetary carrier 42 and meshes with the internal gear 43 at a position protruding from the planetary carrier 42.

The first output gear 46a rotates integrally with the planetary carrier 42. The first output gear 46a has a smaller diameter than that of the large gear 14 and meshes with the large gear 14 outside the large gear 14. The first output gear 46a is an external gear larger than the outer diameter of the planetary carrier 42. The outer side and the lower side of the first output gear 46a are covered with the protruding portion 18a.

Therefore, in the conveyance device 1, by driving the first servomotor 30, as illustrated in FIG. 4, the output shaft 32 and the sun gear 44 rotate, the three planetary gears 45 meshing with the sun gear 44 rotate. Further, since each of the planetary gears 45 meshes with the internal gear 43, each of the planetary gears 45 rolls along the internal gear 43 so as to rotate the planetary carrier 42 relative to the housing 41. As illustrated in FIG. 5, since the first and second output gears 46a and 46b rotate when the planetary carrier 42 rotates, the large gear 14 is rotated, and the turning body 26 (the annular end portion 27) provided with the large gear 14 rotates around the first rotation axis 24 relative to the fixed base 10.

According to the conveyance device 1, by using the planetary gear 45, it is possible to suppress heat generation of the speed reducer 40 even if the first servomotor 30 increases the turning speed of the turning body 26 and the conveyance arm 50. Further, according to the conveyance device 1, by disposing two or more speed reducers 40 around the turning body 26 having the large gear 14 serving as an external gear, it is possible to suppress an increase in size of the entire device while ensuring a high speed reduction ratio. Moreover, since the speed reducers 40 can be disposed at the positions allowing the speed reducers 40 to face each other with the rotation center of the large gear 14 interposed therebetween, it is easy to perform control such that backlash between the large gear 14 and the first and second output gears 46a and 46b is offset. In addition, since stresses in the tangential direction of the large gear 14, respectively generated between the large gear 14 and the first output gear 46a and the large gear 14 and the second output gear 46b, are exactly oriented in the opposite directions, the life span of the gear can be extended. With the conveyance device 1, it is possible to respond to an increase in speed required for the conveyance operation of the workpiece 2 with respect to the press machine 3.

In the conveyance device 1, since backlash is larger than that of the speed-reduction mechanism of JP 2011-212839 A, malfunction due to heat generation is less likely to occur even when the speed is increased. In addition, according to the conveyance device 1, a high speed reduction ratio can be obtained by using the large gear 14 and the output gear 46 as compared with JP 2018-202545 A using a planetary carrier as an output shaft. Therefore, if the motor outputs are the same, the rotational angular acceleration of the turning body 26 can be easily increased, and the conveyance speed can be easily increased.

In the present embodiment, rotation center lines of all the gears used in the speed reducer 40 are parallel to the first rotation axis 24 of the turning body 26, but the present invention is not limited thereto, and may be configured not to be parallel thereto by a combination of known gears.

In addition, the positions of two or more servomotors (30, 31) may be controlled by the control device 6 so as to offset backlash between the servomotors. Since the backlash can be offset, high stop position accuracy can be exhibited at the transfer position of the workpiece 2 even when the speed is increased. Specifically, although there is backlash between the large gear 14 and the two output gears 46, it is possible to offset the backlash at the time of acceleration by performing control such that large torque is generated in one first output gear 46a and slight reverse torque is generated in the other second output gear 46b at the time of acceleration, and it is possible to offset the backlash at the time of deceleration by performing the reverse control.

As a modification, the speed reducers 40 may be vertically connected to each other in a plurality of stages on the second and third rotation axes 34 and 35. By connecting the plurality of speed reducers 40 to each other in a plurality of stages in this manner, the speed reduction ratio can be increased. Therefore, for example, even if the first and second servomotors 30 and 31 are inexpensive and lightweight servomotors such that output torque is reduced, the output torque can be increased by the plurality of speed reducers 40, so that high speed turning of the conveyance arm 50 can be implemented. Moreover, since the plurality of speed reducers 40 are stacked along the second and third rotation axes 34 and 35 (in the direction perpendicular to the turning plane of the conveyance arm 50), an increase in distance between the first rotation axis 24, which is the turning axis of the conveyance arm 50, and the position of the center of gravity of the first and second servomotors 30 and 31 is suppressed. Therefore, an increase in moment of inertia of the turning body 26 including the speed reducer 40 is also suppressed, and acceleration and deceleration of the conveyance arm 50 can be increased. As a result, it is possible to realize continuous high-speed reciprocating operation of the conveyance arm 50 in a limited region (space) such as a space between press machines while suppressing costs.

The present invention is not limited to the above-described embodiments, and various modifications are possible, and the present invention includes substantially the same configurations (configurations having the same functions, methods, and results, or configurations having the same objectives and effects) as the configurations described in the embodiments. In addition, the present invention includes configurations obtained by replacing non-essential elements of the configurations described in the embodiments with other elements. In addition, the present invention includes configurations exhibiting the same operations and effects as those of the configurations described in the embodiments, or configurations capable of achieving the same objectives as those of the configurations described in the embodiments. In addition, the present invention includes configurations obtained by adding known art to the configurations described in the embodiments.

What is claimed is:

1. A conveyance device comprising:
   a fixed base;
   a turning body supported by the fixed base via a bearing;
   two or more servomotors fixed to the fixed base and configured to rotate the turning body relative to the fixed base;
   a conveyance arm configured to be able to convey a workpiece by turning in conjunction with the turning body; and
   two or more speed reducers fixed to the fixed base and respectively connected to the two or more servomotors, wherein
   the turning body includes a large gear serving as an external gear, each of the speed reducers includes:

a housing integrated with the fixed base;

a planetary carrier rotatably supported inside the housing;

an internal gear provided inside the housing;

a sun gear connected to an output shaft of one of the servomotors;

a plurality of planetary gears arranged around the sun gear and rotatably supported by the planetary carrier; and an output gear configured to rotate integrally with the planetary carrier;

wherein each planetary gear meshes with the respective sun gear and meshes with the respective internal gear, and each output gear has a smaller diameter than a diameter of the large gear and meshes with the large gear outside the large gear.

2. The conveyance device according to claim 1, wherein the two or more servomotors include a first servomotor and a second servomotor, the output gears include a first output gear rotated by the first servomotor and a second output gear rotated by the second servomotor, the large gear rotates around a first rotation axis, and the first output gear is located at a position allowing the first output gear to face the second output gear with the first rotation axis interposed between the first output gear and the second output gear.

3. The conveyance device according to claim 1, wherein the workpiece is a metal plate for press working.

4. The conveyance device according to claim 1, wherein the workpiece is a product that has been subjected to press working.

* * * * *